United States Patent [19]

Kaneko et al.

[11] 3,816,825

[45] June 11, 1974

[54] DRIFT-COMPENSATED DOUBLE SAMPLING SEQUENTIAL FEEDBACK TYPE ENCODING SYSTEM

[75] Inventors: Haruo Kaneko; Yoshio Katagiri; Tomonori Okada, all of Tokyo, Japan

[73] Assignee: Nippon Electric Company, Limited, Tokyo-to, Japan

[22] Filed: May 15, 1973

[21] Appl. No.: 360,491

[30] Foreign Application Priority Data

May 18, 1972 Japan .............................. 47-49727

[52] U.S. Cl. .................... 340/347 AD, 340/347 CC

[51] Int. Cl. .......................................... H03k 13/04

[58] Field of Search.............. 340/347 AD, 347 CC; 324/99 D, 130; 328/162, 163, 164

[56] References Cited

UNITED STATES PATENTS

| | | | |
|---|---|---|---|
| 3,495,238 | 2/1970 | Gabriel | 340/347 CC |
| 3,541,315 | 11/1970 | Naydan et al. | 340/347 AD X |
| 3,636,555 | 1/1972 | Waaben | 340/347 AD |
| 3,646,586 | 2/1972 | Kurz | 340/347 AD |
| 3,729,732 | 4/1973 | Yano | 340/347 AD |
| 3,735,392 | 5/1973 | Kaneko | 340/347 CC |

*Primary Examiner*—Charles D. Miller

*Attorney, Agent, or Firm*—Sughrue, Rothwell, Mion, Zinn & Macpeak

[57] ABSTRACT

A double sampling sequential feedback encoding system having means for compensating for drift in a subtraction circuit. The two encoders of a double sampling system have overlapping encoding ranges. The encoded bits from each encoder that correspond to the overlapped range are compared in a monitoring circuit. Differences in the respective bits are detected as drifts and compensating voltages are generated and added to the sampled signal in the second encoder.

2 Claims, 6 Drawing Figures

| $B3_1$ | $B3_2$ | B4, B5 | COMPENSATING SIGNAL POLARITY | STATE |
|---|---|---|---|---|
| 1 | 1 | "1" "1" | NEGATIVE | *1 |
| 1 | 1 | ALL COMBINATIONS OF 1's AND 0's, EXCEPT FOR "11" | — | — |
| 1 | 0 | ANY COMBINATIONS OF 1's AND 0's | POSITIVE | *3 |
| 0 | 1 | SAME AS ABOVE | NEGATIVE | *2 |
| 0 | 0 | ANY COMBINATIONS OF 1's AND 0's EXCEPT FOR "00" | — | — |
| 0 | 0 | "00" | POSITIVE | *4 |

DRIFT-COMPENSATED DOUBLE SAMPLING SEQUENTIAL FEEDBACK TYPE ENCODING SYSTEM

BACKGROUND OF THE INVENTION

This invention relates to a drift-compensated double sampling sequential feedback type encoding system.

A variety of encoding systems for pulse code modulation (PCM) signals have been proposed, such as the parallel, serial, or cascade type encoders, and the combination of them. Owing to the development of high-speed encoders capable of handling wideband signals and to the rapid development of electronic components of high-speed response in recent years, it has become possible to easily provide high-speed, high-sensitivity comparators. As a result, the sequential feedback type encoders have been drawing more attention than even before.

One example of the sequential feedback type encoding system so far proposed is the double sampling sequential feedback type encoding system disclosed in a paper entitled, "Investigation of Sequential Feedback Type Segment Encoders and Consideration for the Encoding Systems" by Kuroyanagi and Yuki published in a Japanese periodical, "Research and Development for Practical Use (Kenkyu Jitsuyooka Hookoku)," Vol. 18, No. 6, 1969, pp. 1399 – 1415. With this system, instead of $n$ bit encoding in one sampling-holding period by the use of single sampling-holding circuit, various signal processing steps are performed successively, i.e., sampling and holding for a first length of time an input analog signal by a first sampling/holding circuit, encoding the more significant bit group consisting of $n'_1$ bits ($n'_1 < n$) by a first encoder during a first sampling holding period, taking the difference between the output of a local decoder in the first encoder and the output from the first sampling/holding circuit, sampling and holding for a second length of time, the difference output by a second sampling-holding circuit, encoding the less significant bit group consisting of $n'_2$ bits ($n'_2 = n - n'_1$) by a second encoder, and finally combining the outputs of the first and second encoders to obtain the $n$-bit code output.

With this double sampling sequential feedback type encoding systems, the encoding time assigned to one sampled signal to the encoded is almost doubled as compared to a conventional sequential feedback type encoding system. This makes the requirement for the high-speed responsive property of the comparators and the like less severe and greatly improves encoding accuracies even when encoding circuits identical to those used in the conventional encoding system are used. However, since this system is divided into two encoding sections, it has very serious defects. More specifically, when the maximum and minimum levels of the residual analogue signal of the first encoding section are shifted with respect to those of the input analogue range of the second encoding section, due to the drift difference between the two encoding sections, marked step errors corresponding to the level shifts occur, greatly deteriorating the S/N characteristics.

SUMMARY OF THE INVENTION

In accordance with the present invention there is provided a double sampling sequential feedback type encoding system in which the drift is compensated to eliminate the above-mentioned defect.

DETAILED DESCRIPTION OF THE PREFERRED EMBODIMENT

Figure 1:
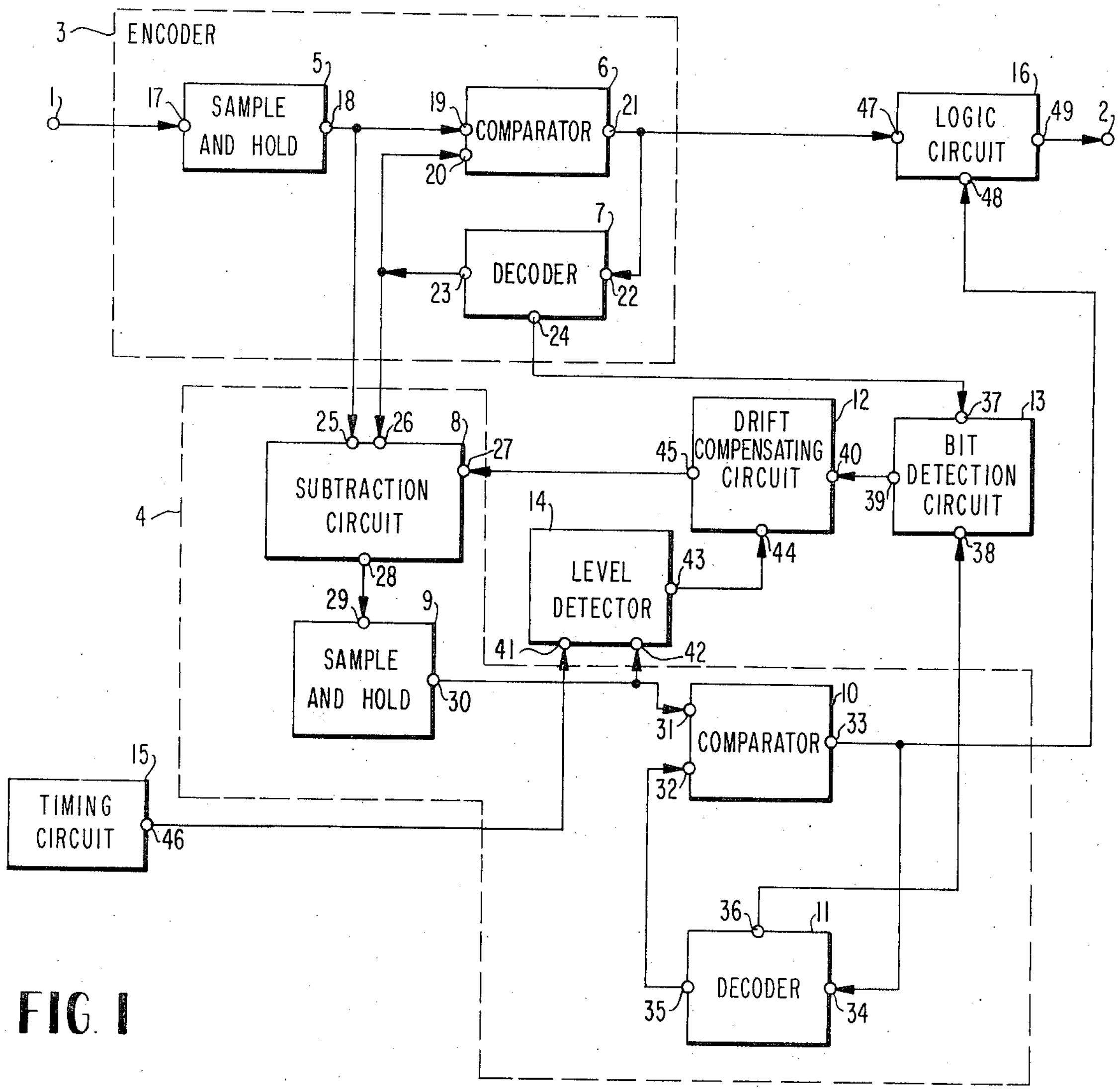
FIG. 1 is a block diagram showing an embodiment of this invention.

Referring to FIG. 1, an input analogue signal from an input terminal 1 is applied to an input terminal 17 of a first sampling-holding circuit 5 in a first encoding section 3. The output delivered from an output terminal 18 of the circuit 5 is applied to an input terminal 19 of a first comparator 6 and, at the same time, to an input terminal 25 of a subtraction circuit 8 in a second encoding section 4. The decoded output delivered from an output terminal 23 of a first local decoder 7 is applied to an input terminal 20 of the first comparator 6 and, at the same time, to an input terminal 26 of the subtraction circuit 8. Coding of the more significant bit group consisting of the first through $n_1$-th bits is performed by a well known sequential feedback type encoder including the first comparator 6 and the first local decoder 7. This type of encoder is detailed in the U.S. Pat. No. 3,419,819 (particularly FIG. 1 thereof), and hence further explanation will not be given here. The above-mentioned sampling-holding circuit can be realized by the circuit shown in FIG. 2 of the above U.S. Patent, which includes a four-diode gate ($RC_4$ – $RC_7$) and a Darlington circuit ($Q_1$, $Q_2$).

The encoded output obtained at an output terminal 21 of the comparator 6 is applied to an input terminal 22 of the first local decoder 7 and, at the same time, to an input terminal 47 of a logic circuit 16. The output for the lower $n_3$-bits in the more significant bit group is applied from an output terminal 24 to an input terminal 37 of an $n_3$-bit monitoring circuit 13. On the other hand, the subtraction circuit 8 delivers from an output terminal 28 thereof the difference signal between the output of the first sampling-holding circuit 5 and the decoded output of the first local decoder 7. The difference signal is applied to an input terminal 29 of a second sampling-holding circuit 9. The difference signal output from the subtraction circuit is sampled by the use of the sampling pulses in a suitable phase relationship with the difference signal output. The output from an output terminal 30 of the second sampling-holding circuit 9 is applied to an input terminal 31 of a second comparator 10 and, at the same time, to an input terminal 42 of a level detection circuit 14. A decoded output of a second local decoder 11 is delivered from its output terminal 35 to an input terminal 32 of the second comparator 10. The encoding of the less significant bit group consisting of the $(n_1 - n_3 + 1)$-th through $n$-th bits is carried out in the second comparator 10 and the second local decoder 11 by the known sequential feedback encoding method. The encoded output of the second comparator 10 is applied from its output terminal 33 to an input terminal 34 of the second local decoder 11 and, at the same time, to an input terminal 48 of the logic circuit 16. The outputs for the higher $n_3$ bits in the less significant bit group are applied from an output terminal 36 of the second local decoder 34 to an input terminal 38 of the $n_3$-bit monitoring circuit 13. The $n_3$ bit outputs from the first and second encoding sections are obtained from the memory circuits for the $n_3$ bits, such as D-type flip-flops, included in the respective local decoders by sampling the outputs of the above-mentioned memory circuits by the corresponding sampling pulses delivered from the control pulse source also included in the respective local decoders. The $n_3$-bit monitoring circuit 13 is for monitoring the coincidence or noncoincidence of the lower $n_3$ bits in the more significant bit group and the higher $n_3$ bits in the less significant bit group, and is realized, for instance, by simple exclusive OR circuits. When there is no drift between the first and second encoding sections 3 and 4 with both sections functioning normally, the $n_3$-bit monitoring circuit 13 develops no output signal. On the contrary, when a drift is caused between the two encoding sections, an output signal of positive or negative polarity, for instance, is produced depending on the drift state.

The monitoring output signal delivered from an output terminal 39 of the $n_3$-bit monitoring circuit 13 is applied to an input terminal 40 of a drift compensating signal supplying circuit 12. The level detection circuit 14 has a function of detecting a departure of the output of the second sampling-holding circuit 9 from the encoding range of the second encoder composed of the second comparator 10 and the second local decoder 11. It develops no output signal, when the output of the sampling-holding output is within the encoding range but, develops an output signal of positive (or negative) polarity when the departure occurs in the positive (or negative) level direction. The detected output is delivered from an output terminal 43 of the level detection circuit 14 to an input terminal 44 of the drift compensating signal supply circuit 12. This circuit 12 delivers a drift compensating signal from its output terminal 45 to an input terminal 27 of the subtraction circuit 8, by using the output signals from the $n_3$-bit monitoring circuit 13 and the level detection circuit 14. A timing circuit 15 delivers a locking signal from its output terminal 46 to an input terminal 41 of the level detection circuit 14 after a predetermined length of time measured from the turning on of the system power supply lock the level detection circuit 14. Both the encoded output for the 1st through $n_1$-th bits from the first encoding section and the encoded output for the $(n_1 - n_3 + 1)$-th through $n$-th bits from the second encoding section undergo a suitable logic operation including speed transfer in the logic circuit 16 to obtain the normal encoded output for the combined 1st through $n$-th bits at an output terminal 2 through an output terminal 49 of the logic circuit 16.

In the embodiment of this invention described above, the drift compensating signal may be fed to the second sampling-holding circuit 9 when the drift in the subtraction circuit is negligible. Moreover, both the level detection circuit 14 and the timing circuit 15 can be dispensed with if the reduction in the drift detection probability and comparatively long time interval needed for achieving the stable operation are tolerated.

The operation of the drift compensating device will be described with reference to FIGS. 2 and 3. For simplicity, a description will be made of a case where $n = 5$, $n_1 = n_2 = 3$ and $n_3 = 1$. This signifies that the 1st through 3rd bits and the 3rd through 5th bits are encoded in the first and second encoding sections, respectively, and the 3rd bit is encoded in both the encoding sections.

Figure 2:
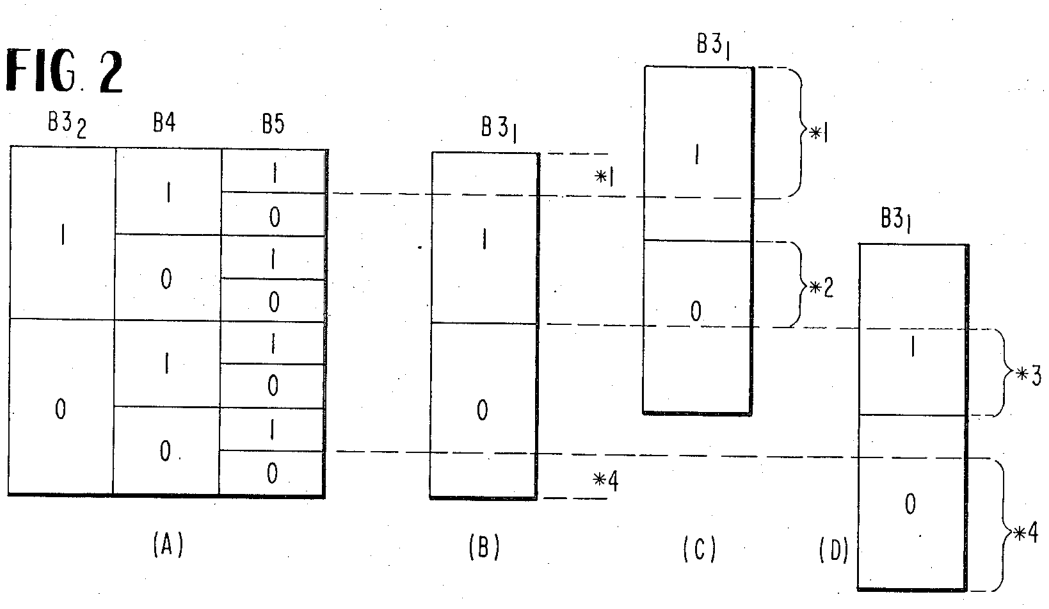
FIGS. 2 and 3 are diagrams showing drift states for the explanation of this invention.

FIGS. 2(A), (B), (C) and (D) illustrate several cases of the drift condition of the input analogue signal in the second encoding section in comparison with the decoded output of the second local decoder in the second encoding section, wherein: FIG. 2(A) shows relationship between the decoded output (ordinate) of the second local decoder and the corresponding encoded output; and FIGS. 2(B) through (D) indicate the input analogue signals of the second encoder, with no drift (normal state), the drift of a positive level side, and the drift of the negative level side, respectively. In this figure, $B_{31}$ denotes the 3rd bit output of the second encoding section, and $B_4$ and $B_5$ denote, respectively, the 4th bit and 5th bit outputs of the second encoding section. It will be seen in FIG. 2 that the four states of the drift, *1 through *4, need be detected to determine the drift compensating signals.

Figures 3, 6:
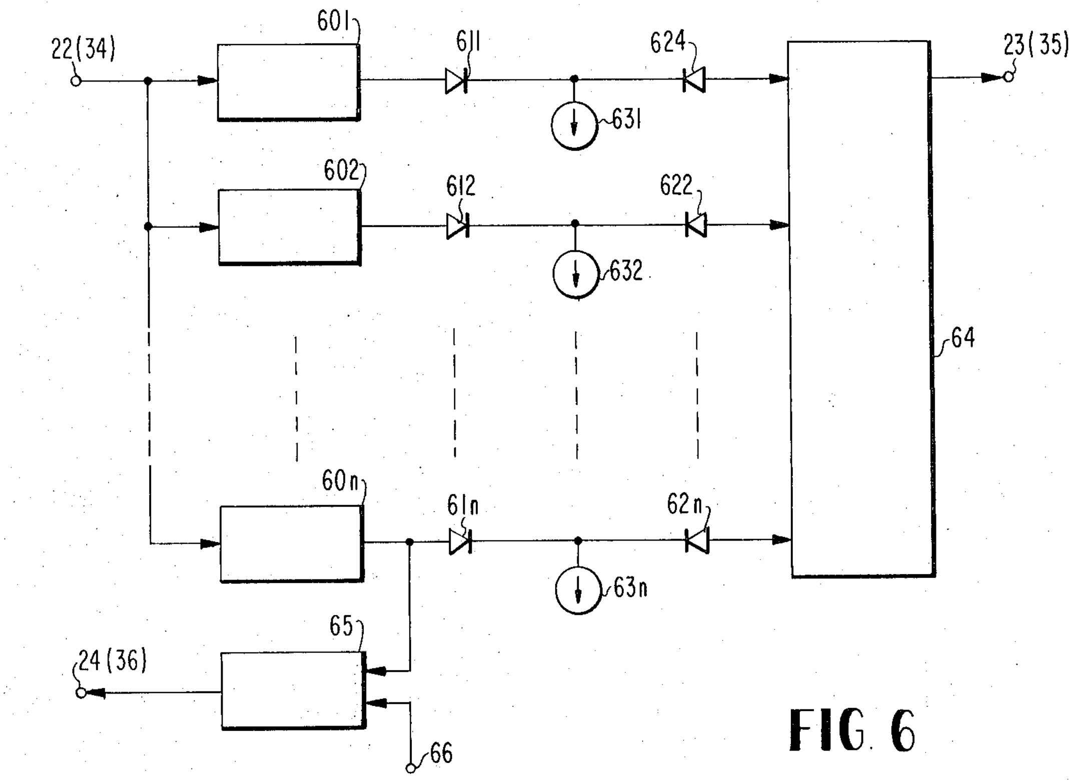
FIG. 6 is a circuit diagram showing a concrete example of the local decoders included in the embodiment of FIG. 1.

FIG. 3 shows a relationship between the 3rd bit output of the first encoder section, the 3rd through 5th bit outputs of the second encoding section and the polarities of the drift compensating signals. In case where the state *1 or *2 is detected, the polarity of the drift compensating signal is determined as negative, whereas in case where the state *3 or *4 is detected, the polarity of the drift compensating signal is determined as positive. In other cases, the drift compensating signal should be kept unchanged, or constant.

Since, the detection of the state *1 or *4 is essentially needed during the time interval from turning on of the power supply to the establishment of the stable operation, it is desirable that the function of detecting the state *1 or *4 be locked by the use of the timing circuit as mentioned previously. Incidentally, the polarity of the compensating signal can be inverted by a suitable inverter in response to whether the compensating signal is supplied to the input of the subtraction circuit or of the second sampling-holding circuit 9.

Figure 4:
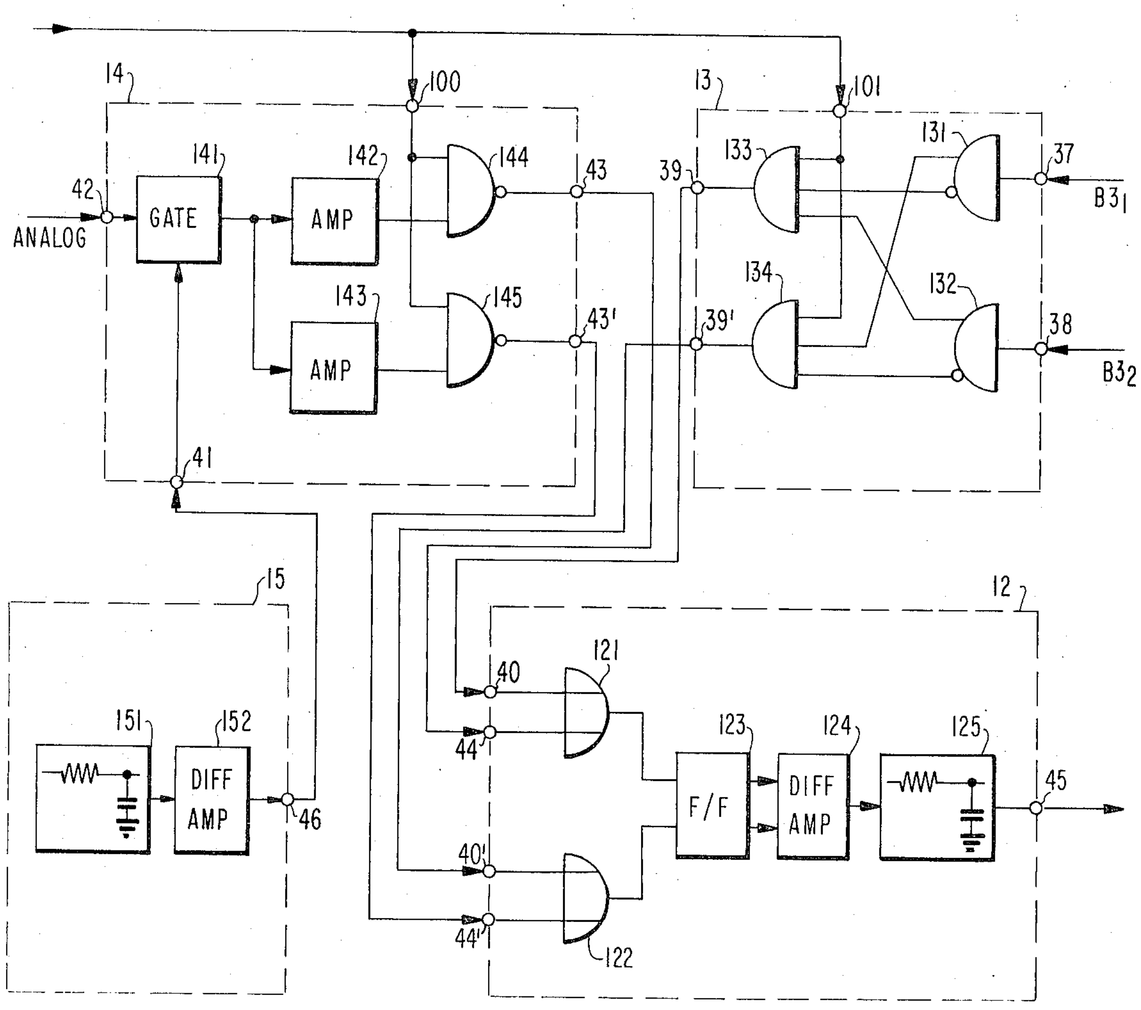
FIG. 4 is a block diagram illustrating a part of the embodiment of this invention for explaining in detail the present invention.

FIG. 4 shows detailed circuit construction of the drift compensating signal supply circuit 12, the $n_3$ bit monitoring circuit 13, the level detecting circuit 14 and the timing circuit 15 in FIG. 1. The encoded 3rd bits $B_{31}$ and $B_{32}$ are applied, respectively, to the input terminals 37 and 38 of the 3rd bit monitoring circuit 13. Numerals 131 through 134 represent gate circuits. The gates 133 and 134 are gated by gating pulses applied to a terminal 101 which are at the sampling frequency and whose period is equal to that of the sampling pulses. An output "1" is obtained at output terminal 39 in case $B_{31}$ is "0" and $B_{32}$ is "1," and an output "0" is obtained in other cases. On the other hand, the input analogue signal to the second encoder is applied to the input terminal 42 of the level detection circuit 14. The analogue signal passed through a gate 141 is fed to differential amplifiers 142 and 143 each having a reference voltage to be compared with its input signal. The gate 141 is in open state in the absence of the locking signal from the timing circuit 15 which is applied to the terminal 41, causing the input analogue signal to reach the differential amplifiers 142 and 143. The gate 141 is closed when there is the locking signal, preventing the input analogue signal from reaching the differential amplifiers 142 and 143. The outputs of the differential amplifiers 142 and 143 are gated by pulses of the sampling frequency applied to gates 144 and 145 through a terminal 100. Since, the reference level of the differential amplifier 142 is set at the highest level in the encoding range of the second encoding section, the output "1" (or "0") is obtained at the output terminal 43 when the input analogue signal is above (or below) the highest level. Similarly, since the reference level of the differential amplifier 143 is set at the lowest level in the encoding range of the second encoding section, the output "1" (or "0") is obtained at an output terminal 43' when the input analogue signal level becomes lower (or higher) than the lowest level. In the drift compensating signal supply circuit 12, a logic summation of the output from the output terminal 39 of the 3rd bit monitoring circuit 13 and the output from the output terminal 43 of the level detection circuit 14 is obtained by an OR gate 121. Similarly, another logic summation of the signal applied from an output terminal 39' of the 3rd bit monitoring circuit 13 to an input terminal 40' and the signal applied from the output terminal 43' of the level detection circuit 14 to an input terminal 44' is obtained by another OR gate 122. The numeral 123 denotes a flip-flop driven by the outputs of the OR gates 121 and 122. The true and complementary outputs of the flip-flop 123 are applied to the input terminals of a differential amplifier 124. The output of the differential amplifier 124 is fed to an integrator circuit 125 composed of capacitance and resistance elements. Thus, the drift compensating signal is obtained at the output terminal 45. On turning on of the system power supply, the electric charge in the capacitor in a C-R integrator circuit 151 included in the timing circuit 15 increases with time. The output of the integrator circuit 151 is applied to a differential amplifier 152 with a predetermined reference level therein. When the output of the integrator circuit exceeds the reference level, a locking signal is delivered through the terminal 46 to the terminal 41 of the level detection circuit 14 to close the gate 141.

Figure 5:
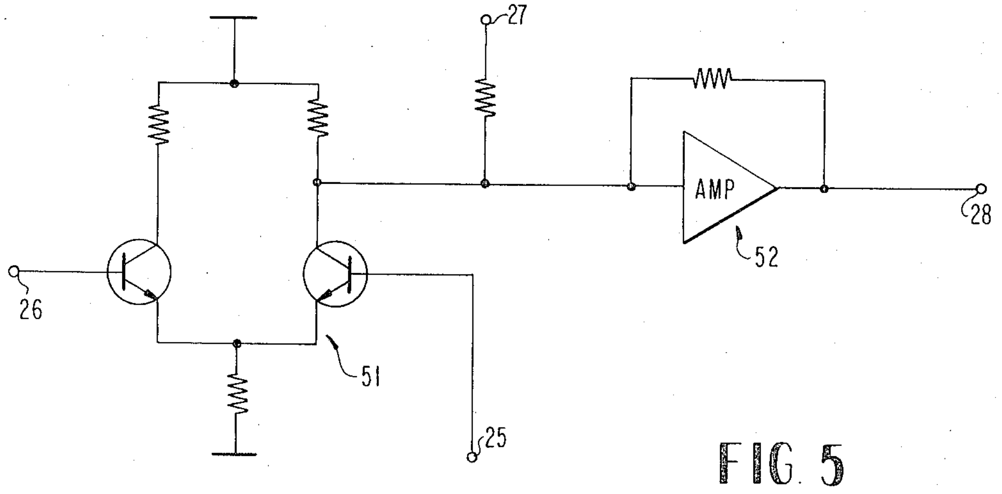
FIG. 5 is a circuit diagram showing a concrete example of the subtraction circuit employed in the embodiment of FIG. 1.

FIG. 5 shows a concrete circuit construction of the subtraction circuit 8, which includes a differential amplifier 51 and a negative feedback amplifier 52. The numerals 25 to 28 are the input and output terminals of the subtraction circuit 8 as shown in FIG. 2.

FIG. 6 shows a concrete circuit construction of the local decoder 7 (or 11), which includes memory circuits **601, 602, . . . 60*n* and 65, such as D-type flip-flops; diode switches 611, 621, 622, . . . 61*n*, 62*n*; constant current sources 631, 632, . . . 63*n*; and a ladder type resistance network 64, such as the resistors 505 – 511 of FIG. 1 of the above U.S. Pat. No. 3,419,819. The numerals 22 to 24 (or 34 to 36) are the input and output terminals of the local decoder 7 (or 11) as shown in FIG. 2. The numeral 66 denotes an input terminal for applying a read out pulse immediately after the $n_3$ bit determination to deliver the $n_3$ bit output from the terminal 24 (or 36**).

According to the invention, the drift difference between the two encoding sections is compensated so that the above-mentioned step errors are reduced and the signal-to-noise ratio of the double sampling sequential feedback type encoding system is increased.

What is claimed is:

1. A drift compensated double sampling sequential feedback type encoding system for converting an input analogue signal into a pulse code modulation signal employing an *n* bit code per each word (*n* being a positive integer), comprising:

a first encoding means for encoding first through $n_1$th bits among said *n* bit code ($n_1$ being a positive integer smaller than *n*), including a first sampling-holding circuit for sampling said input analogue signal and holding the sampled input analog signal;

a first comparator for comparing said sampled input analogue signal with a first reference analogue signal to deliver from its output said first through $n_1$th bits, and a first local decoder for decoding said first through $n_1$th bits to obtain said first reference analogue signal;

a second encoding means for encoding $(n_1 - n_3 + 1)$th through *n*th bits among said *n* bit code ($n_3$ is a positive integer smaller than $n_1$), including a subtraction circuit for providing a difference signal between said sampled input analogue signal and said first reference analogue signal, a second sampling-holding circuit for sampling said difference signal and holding the sampled difference signal, a second comparator for comparing said sampled difference signal with a second reference signal to deliver from its output said $(n_1 - n_3 + 1)$th through *n*th bits, and a second local decoder for decoding said $(n_1 - n_3 + 1)$th through *n*th bits to obtain said second reference analogue signal;

logic means for combining the outputs of said first and second encoding means to obtain said pulse code modulation signal in a time-serial form;

monitoring means for monitoring whether or not the $(n_1 - n_3 + 1)$ th through $n_1$th bits obtained by said first encoding means are coincident with the $(n_1 - n_3 + 1)$th through $n_1$th bits obtained by said second encoding means; and means for adding a compensating signal to said difference signal in response to the output of said monitoring means, thereby to compensate the drift between the first and second encoding means.

2. The combination claimed in claim 1 wherein said second encoding means further comprises, a level detecting circuit responsive to said sampled difference signal for detecting if said sampled difference signal is outside the predetermined amplitude range of said second encoding means, and wherein said means for adding a compensating signal is additionally responsive to said level detecting circuit for bringing said difference signal within said predetermined range.

* * * * *

UNITED STATES PATENT OFFICE
CERTIFICATE OF CORRECTION

Patent No. 3,816,825 Dated June 11, 1974

Inventor(s) Haruo Kaneko et al

It is certified that error appears in the above-identified patent and that said Letters Patent are hereby corrected as shown below:

In The Specification:

Column 1, line 20 - delete "even" and insert -- ever -- line 51 - "to the encoded" should be -- to be encoded --

Column 4, line 27 - "$B_{31}$" should be -- $B3_1$ -- line 27 - after "section," insert -- $B3_2$ denotes the 3rd bit out of the second encoding section, -- line 28 - "$B_4$ and $B_5$" should be -- B4 and B5 -- line 57 - "B31" should be -- $B3_1$ -- line 58 - "$B_{32}$" should be -- $B3_2$ -- line 64 - "$B_{31}$" should be -- $B3_1$ -- line 65 - "$B_{32}$" should be -- $B3_2$ --

Signed and sealed this 26th day of November 1974.

(SEAL)
Attest:

McCOY M. GIBSON JR.
Attesting Officer

C. MARSHALL DANN
Commissioner of Patents